United States Patent
Kim et al.

(10) Patent No.: US 9,509,008 B2
(45) Date of Patent: Nov. 29, 2016

(54) DIBENZYLATED POLYBENZIMIDAZOLE BASED POLYMER AND METHOD FOR PREPARING THE SAME

(71) Applicant: KOREA INSTITUTE OF SCIENCE AND TECHNOLOGY, Seoul (KR)

(72) Inventors: Hyoung-Juhn Kim, Suwon-si (KR); Jin Young Kim, Seoul (KR); Sung Jong Yoo, Seoul (KR); Jong Hyun Jang, Seoul (KR); Eun Ae Cho, Seoul (KR); Sun-Hee Choi, Seoul (KR); Jonghee Han, Seoul (KR); Hyung Chul Ham, Seoul (KR); Dirk Henkensmeier, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 14/627,945

(22) Filed: Feb. 20, 2015

(65) Prior Publication Data
US 2015/0311555 A1 Oct. 29, 2015

(30) Foreign Application Priority Data

Apr. 23, 2014 (KR) ........................ 10-2014-0048926

(51) Int. Cl.
| | |
|---|---|
| C08G 69/08 | (2006.01) |
| H01M 8/10 | (2016.01) |
| C08J 5/22 | (2006.01) |
| C08G 73/18 | (2006.01) |
| H01M 8/08 | (2016.01) |

(52) U.S. Cl.
CPC .............. *H01M 8/103* (2013.01); *C08G 73/18* (2013.01); *C08J 5/22* (2013.01); *H01M 8/1072* (2013.01); *H01M 8/083* (2013.01); *H01M 2008/1095* (2013.01); *H01M 2300/0082* (2013.01); *Y02E 60/521* (2013.01); *Y02P 70/56* (2015.11)

(58) Field of Classification Search
CPC ........................... C08G 73/18; C08J 2379/04
See application file for complete search history.

(56) References Cited

FOREIGN PATENT DOCUMENTS

| KR | 10-2012-0115848 A | 10/2012 |
|---|---|---|
| KR | 1020130097441 A | 9/2013 |
| KR | 1020130102592 A | 9/2013 |
| WO | 2012035556 A | 3/2012 |

OTHER PUBLICATIONS

Boydston et al., J. Am. Chem. Soc. 2005, 127, 12496-12497.*
Dirk Henkensmeier et al., Polybenzimidazolium-based solid Electrolytes, Macromolecular Materials and Engineering, 2011, vol. 296.pp. 899-908, Korea.

(Continued)

*Primary Examiner* — Shane Fang
(74) *Attorney, Agent, or Firm* — Goldilocks Zone IP Law

(57) ABSTRACT

A polybenzimidazole based polymer in which substituted or non-substituted benzyl groups are introduced to the two nitrogen atoms of benzimidazole ring. The benzimidazole ring is not decomposed by the attack of hydroxide ions but shows excellent alkali resistance, and thus maintains high ion conductivity. The polybenzimidazole based polymers are particularly useful for not only solid alkali exchange membrane fuel cells (SAEMFC) but also various industrial fields in which polybenzimidazole based polymers are used.

4 Claims, 15 Drawing Sheets

(56) References Cited

OTHER PUBLICATIONS

Hye-Jin Lee et al., Synthesis and characterization of poly(benzimidazolium) membranes for anion exchange membrane fuel cells, J. Polym. Bull., 2013, vol. 70, pp. 2619-2631.

Dirk Henkensmeier et al., Polybenzimidazolium hydroxides—Structure, stability and degradation, Polymer Degradation and Stability., 2012, vol. 97, pp. 264-272.

* cited by examiner

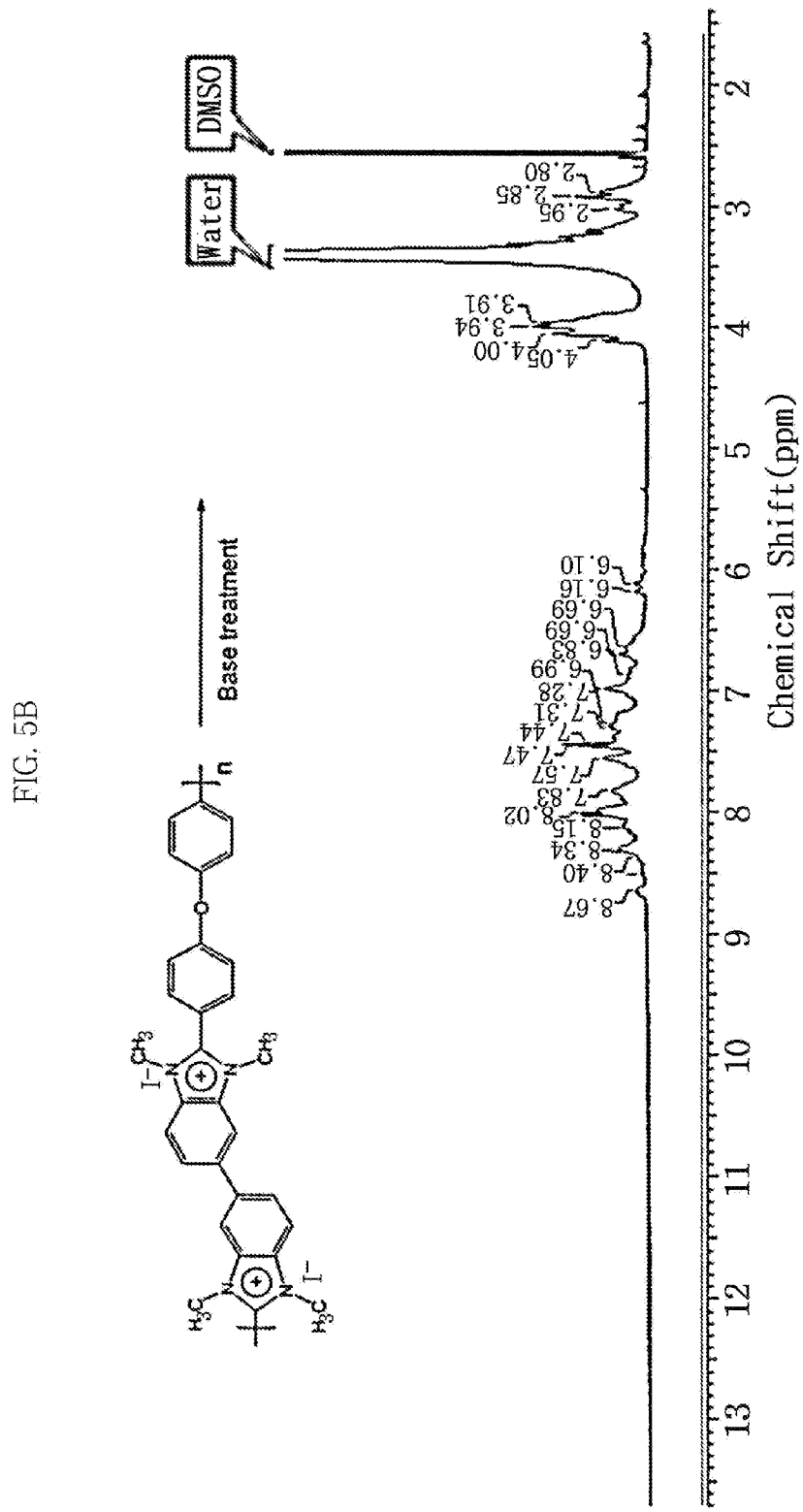

DIBENZYLATED POLYBENZIMIDAZOLE BASED POLYMER AND METHOD FOR PREPARING THE SAME

CROSS-REFERENCE TO RELATED APPLICATION

This application claims priority to Korean Patent Application No. 10-2014-0048926, filed on Apr. 23, 2014, and all the benefits accruing therefrom under 35 U.S.C. §119, the contents of which in its entirety are herein incorporated by reference.

BACKGROUND

1. Field

The present disclosure relates to a dibenzylated polybenzimidazole based polymer and a method for preparing the same.

2. Description of the Related Art

Fuel cells are energy conversion systems by which chemical energy of fuel is converted directly into electrical energy, and are next-generation power generating systems that cause substantially no contamination while providing high efficiency. Among various fuel cells, proton exchange membrane fuel cells (also referred to as PEMFC hereinafter) are driven at low temperature and provide high efficiency, and thus are used in various fields, including power sources for transportation, portable power sources and main power sources for houses. However, PEMFC uses a noble metal Pt catalyst and expensive perfluorosulfonated polymer electrolyte such as Nafion. As a result, PEMFC has a significant limitation in its commercialization. Therefore, there is an imminent need for a novel type of fuel cell.

To overcome the above problem of PEMFC, active studies have been conducted about alkaline fuel cells (also referred to as AFC hereinafter). AFC uses a low-cost hydroxyl ($OH^-$) ion exchange electrolyte and non-noble metal catalyst. Particularly, such a non-noble metal catalyst shows high activity in alkaline atmosphere, unlike PEMFC. As a result, AFC can overcome the disadvantages of PEMFC with ease.

Recently, many studies have been conducted to develop a solid electrolyte that substitutes for a liquid electrolyte used in the conventional AFC. When using a solid electrolyte capable of exchange of hydroxide ions, since a solid electrolyte membrane has high ion conductivity with which hydroxide ions can be transported in a neutral state, the AFC using a solid electrolyte membrane is advantageous in that it avoids a need for circulation of strong alkaline solution, unlike the conventional AFC. In addition, a solid electrolyte membrane allows a fuel cell to be driven in a neutral state, thereby solving the problem of corrosion caused by the use of strong alkali. Further, in the case of a solid alkaline exchange membrane fuel cell (also referred to as SAEMFC hereinafter), no precipitation of potassium carbonate ($K_2CO_3$) occurs in the membrane. By virtue of the above-mentioned advantages, many attentions have been given to development of solid alkaline exchange membrane fuel cells (SAEMFC).

To transport hydroxide ions, specific functional groups are required. Particular examples of such functional groups include quaternary ammonium groups. Polymers, such as poly(ether)sulfone (PES), poly(ether ether ketone) (PEEK) and polystyrene, can transport hydroxide ions when they adopt quaternary ammonium groups. In addition to quaternary ammonium groups, other functional groups such as guadinium, phosphonium and imidazolium may be used. However, because most of such polymers have low quality and poor long-term stability, it is required to develop a novel electrolyte membrane having high quality and long-term stability.

Polymer electrolyte membranes capable of transporting alkali ions such as hydroxide ions ($OH^-$), carbonate ions ($CO_3^{2-}$) and potassium carbonate ions ($KCO_3^-$) have been produced by using polybenzimidazole derivatives. It has been found that although polybenzimidazole itself has low ability of transporting the corresponding ions, two methyl groups bound to the two nitrogen positions of polybenzimidazole can improve the ability significantly.

However, according to the studies conducted by the present inventors, when dimethylated polybenzimidazole is subjected to ion exchange in a strong alkaline solution such as potassium hydroxide (KOH) solution, the polymer undesirably undergoes decomposition of a benzimidazole ring due to the attack of strong hydroxide ions.

REFERENCES

Non-Patent Documents

Henkensmeier, D. et al. Polybenzimidazolium-based solid electrolytes. Macromol. Mater. Eng. 296, 899-908 (2011)
Lee, H.-J. et al. Synthesis and characterization of poly(benzimidazolium) membranes for anion exchange membrane fuel cells. J. Polym. Bull. 70, 2619-2631 (2013)
Henkensmeier, D. et al. Polybenzimidazolium hydroxides—Structure, stability and degradation. Polym Degrad Stab. 97, 264-272 (2012)

SUMMARY

The present inventors conducted many studies to develop a material having a novel structure to which new substituent groups are introduced instead of the methyl groups according to the related art so that the benzimidazole ring maintains a stable structure upon exchange of hydroxide ions. The present disclosure is directed to providing a polybenzimidazole based polymer that maintains hydroxide ion conductivity equal to or higher than the hydroxide ion conductivity of a methyl-substituted polybenzimidazole based polymer, while not undergoing decomposition of the benzimidazole ring caused by the attack of hydroxide ions. The present disclosure is also directed to providing a method for preparing the polybenzimidazole based polymer.

In one aspect, there is provided a dibenzylated polybenzimidazole based polymer including dibenzylated benzimidazolium in which substituted or non-substituted benzyl groups are bound to each of the two nitrogen atoms of benzimidazole ring of a polybenzimidazole based polymer.

In another aspect, there is provided a method for preparing a dibenzylated polybenzimidazole based polymer including introducing substituted or non-substituted benzyl groups to the two nitrogen atoms of benzimidazole ring of polybenzimidazole based polymer to carry out dibenzylation.

In still another aspect, there is provided a method for enhancing alkaline resistance of a polybenzimidazole based polymer, including introducing substituted or non-substituted benzyl groups to the two nitrogen atoms of benzimidazole ring of polybenzimidazole based polymer.

In yet another aspect, there is provided an electrolyte membrane including poly(dibenzylated benzimidazolium) hydroxide, and a solid alkali exchange membrane fuel cell including the same.

According to the embodiments of the present disclosure, the benzimidazole ring of a polybenzimidazole based polymer undergoes no decomposition even under the attack of hydroxide ions. Thus, it is possible to provide excellent alkaline resistance and to maintain high ion conductivity.

The polybenzimidazole based polymer disclosed herein and electrolyte membrane using the same are particularly useful for not only solid alkali exchange membrane fuel cells (SAEMFC) but also various industrial fields in which polybenzimidazole based polymers are used.

BRIEF DESCRIPTION OF THE DRAWINGS

FIGS. 5A and 5B show the results of $^1$H-NMR after subjecting the membranes (Me-PBI-IPA-I and Me-PBI-OBBA-I) of Comparative Examples to ion exchange in a potassium hydroxide solution.

DETAILED DESCRIPTION

Figure 1A:
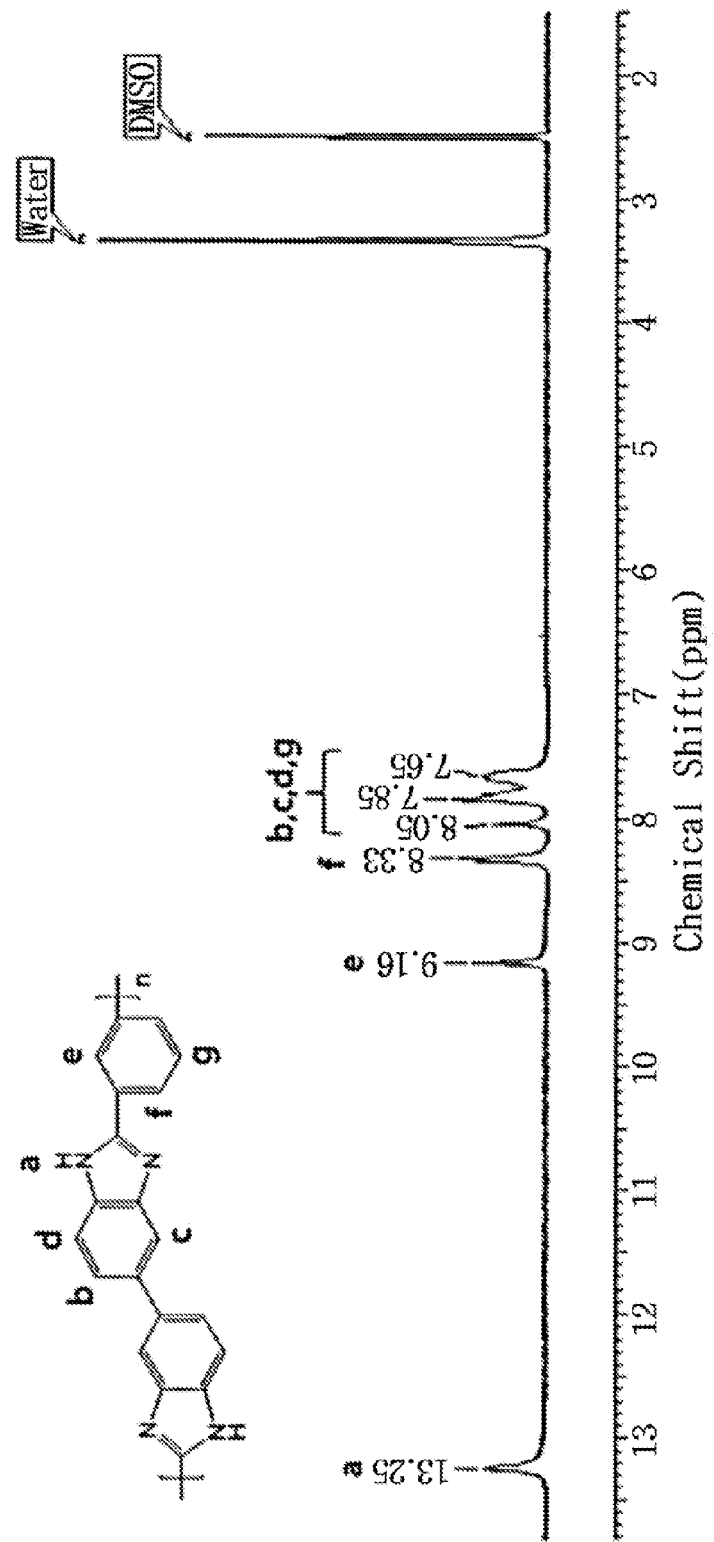
FIGS. 1A and 1B illustrate the results of $^1$H-NMR of the polymer structures of PBI-IPA and PBI-OBBA polymerized from Test Examples (FIG. 1A illustrates the analysis results of PBI-IPA, and FIG. 1B illustrates the analysis results of PBI-OBBA).

Exemplary embodiments now will be described more fully hereinafter with reference to the accompanying drawings, in which exemplary embodiments are shown.

As used herein, 'polybenzimidazole based polymer' means polybenzimidazole or a derivative thereof.

As used herein, 'alkaline resistance or stability of a polybenzimidazole based polymer' means the property of the benzimidazole ring in a polybenzimidazole based polymer capable of resisting against decomposition caused by the attack of hydroxide ions.

The inventors of the present invention investigated whether the benzimidazole ring of a polybenzimidazole based polymer is stabilized or not, when it is subjected to exchange with hydroxide ions (OH$^-$) after introducing benzyl groups to the nitrogen atoms of benzimidazole ring instead of methyl groups. As a result, when introducing benzyl groups to the nitrogen atoms of benzimidazole ring of a polybenzimidazole based polymer, the polymer shows significantly enhanced alkaline resistance even after the exchange with hydroxide ions (OH$^-$) and provides significantly improved stability. In addition, it is shown that the dibenzylated polybenzimidazole based polymer having benzyl groups introduced thereto maintains high ion conductivity equal to or higher than the ion conductivity of the corresponding methyl group-containing polymer.

In one aspect, there is provided a dibenzylated polybenzimidazole based polymer including dibenzylated benzimidazolium in which benzyl groups are bound to each of the two nitrogen atoms of benzimidazole ring of a polybenzimidazole based polymer.

According to an embodiment, the dibenzylated polybenzimidazole based polymer is poly(dibenzylated benzimidazolium) halide in which halide is bound to dibenzylated benzimidazolium.

According to another embodiment, the halide may be I or Br.

According to still another embodiment, the dibenzylated polybenzimidazole based polymer is poly(dibenzylated benzimidazolium) hydroxide in which hydroxide is bound to dibenzylated benzimidazolium.

According to still another embodiment, the benzyl group may be substituted or non-substituted, and particular examples of the substituent include but are not limited to alkyl groups (methyl, ethyl, propyl, butyl, tert-butyl, or the like), NO$_2$, NH$_3$, OH, SO$_3$H and CO$_2$H.

According to still another embodiment, the polybenzimidazole based polymer is polybenzimidazole or a derivative thereof with no particular limitation. In an exemplary embodiment, the polybenzimidazole based polymer may be any one of the polybenzimidazole based polymers as shown below.

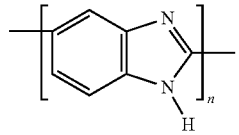

[Chemical Formula 1]

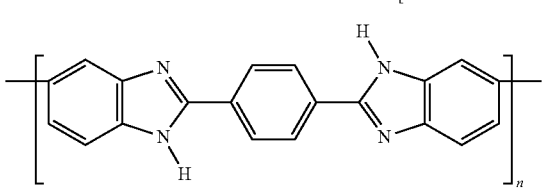

[Chemical Formula 2]

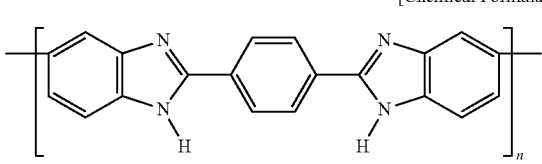

[Chemical Formula 3]

[Chemical Formula 4]

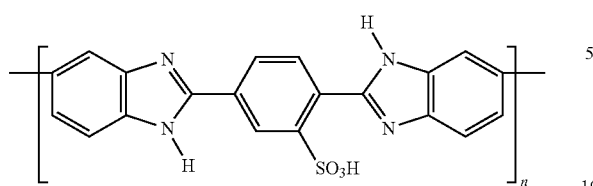

[Chemical Formula 5]

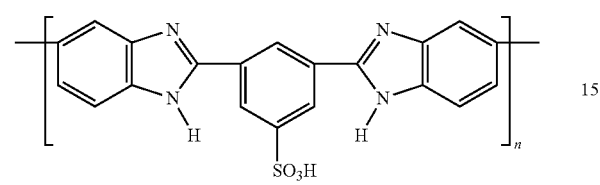

In an exemplary embodiment, the poly(dibenzylated benzimidazolium) halide is a compound represented by the following Chemical Formula 6.

[Chemical Formula 6]

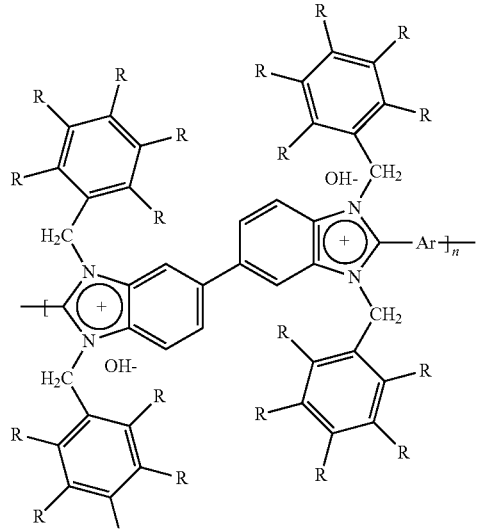

[wherein Ar is

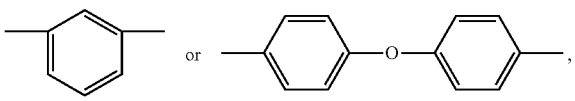

X is I or Br, R independently represents H, alkyl group (methyl, ethyl, propyl, butyl, tert-butyl, or the like), NO$_2$, NH$_3$, OH or SO$_3$H, and n is the number of repeating units].

In an exemplary embodiment, the poly(dibenzylated benzimidazolium) hydroxide is a compound represented by the following Chemical Formula 7.

[Chemical Formula 7]

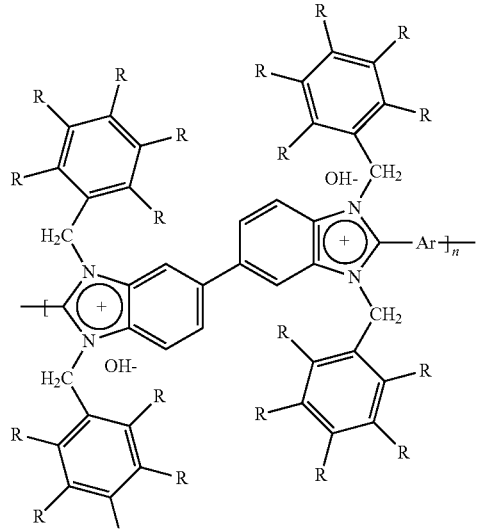

[wherein Ar is

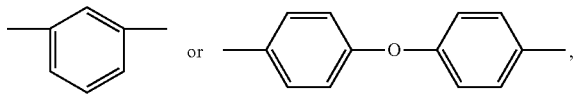

X is I or Br, R independently represents H, alkyl group (methyl, ethyl, propyl, butyl, tert-butyl, or the like), NO$_2$, NH$_3$, OH or SO$_3$H, and n is the number of repeating units].

In another aspect, there is provided a method for preparing a dibenzylated polybenzimidazole based polymer including bonding benzyl groups to each of the two nitrogen atoms of benzimidazole ring of polybenzimidazole based polymer to carry out dibenzylation.

In an exemplary embodiment, there is provided a method for preparing a dibenzylated polybenzimidazole based polymer, including: introducing benzyl groups to the two nitrogen atoms of benzimidazole ring of polybenzimidazole based polymer; and introducing hydroxide ions to the dibenzylated polybenzimidazole based polymer to which benzyl groups are introduced.

When the polybenzimidazole based polymer is dibenzylated through the introduction of benzyl groups as described above, it is possible to enhance the alkaline resistance of a polybenzimidazole based polymer. Therefore, in still another aspect, there is provided a method for enhancing alkaline resistance of a polybenzimidazole based polymer, including introducing benzyl groups to the two nitrogen atoms of benzimidazole ring of polybenzimidazole based polymer.

In still another aspect, there is provided an electrolyte membrane including the poly(dibenzylated benzimidazolium) hydroxide.

In yet another aspect, there is provided a solid alkali exchange membrane fuel cell having the electrolyte membrane including the poly(dibenzylated benzimidazolium) hydroxide. The polymers disclosed herein is particularly useful for electrolyte of solid alkali exchange membrane fuel cell (SAEMFC), and may be used advantageously in other industrial fields in which a polybenzimidazole based polymer is used.

The examples and experiments will now be described. The following examples and experiments are for illustrative purposes only and not intended to limit the scope of the present disclosure.

Materials for Experiments

For experiments, 3,3'-diaminobenzidine (DAB), isophthalic acid (IPA), 4,4'-oxybis(benzoic acid) (OBBA), 115% polyphosphoric acid (PPA), anhydrous N-methyl-2-pyrrolidine (NMP), sodium hydride (NaH), iodomethane and benzyl bromide are purchased from Sigma-Aldrich and used without any additional purification.

Synthesis of Polybenzimidazole Derivatives

Prepared are two FBI derivative, i.e., the compound represented by the following Chemical Formula 8 (also referred to as PBI-IPA hereinafter) obtained from polymerization of 3,3'-diaminobenzidine and isophthalic acid, and the compound represented by the following Chemical Formula 9 (also referred to as PBI-OBBA hereinafter) obtained from polymerization of 3,3'-diaminobenzidine and 4,4'-oxybis(benzoic acid).

[Chemical Formula 8]

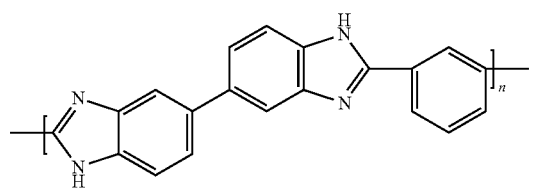

[Chemical Formula 9]

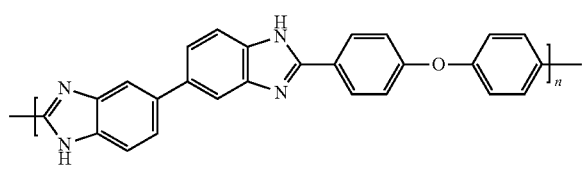

Particularly, 3,3'-diaminobenzidine (DAB) (3 g, 0.014 mol), isophthalic acid (IPA) (2.32 g, 0.014 mol) and 125 g polyphosphoric acid (PPA) are introduced to a round-bottom flask and reaction is carried out at 220° C. for 1 hour under argon gas atmosphere. After the polymer solution is precipitated in deionized water, it is washed with about 15% aqueous ammonia at 50° C. for 3 days. Then, the resultant solution is washed and dried several times to provide PBI-IPA polymer.

Meanwhile, PBI-OBBA is prepared by using 4,4'-oxybis(benzoic acid) (OBBA) as a monomer instead of IPA.

Figure 1B:
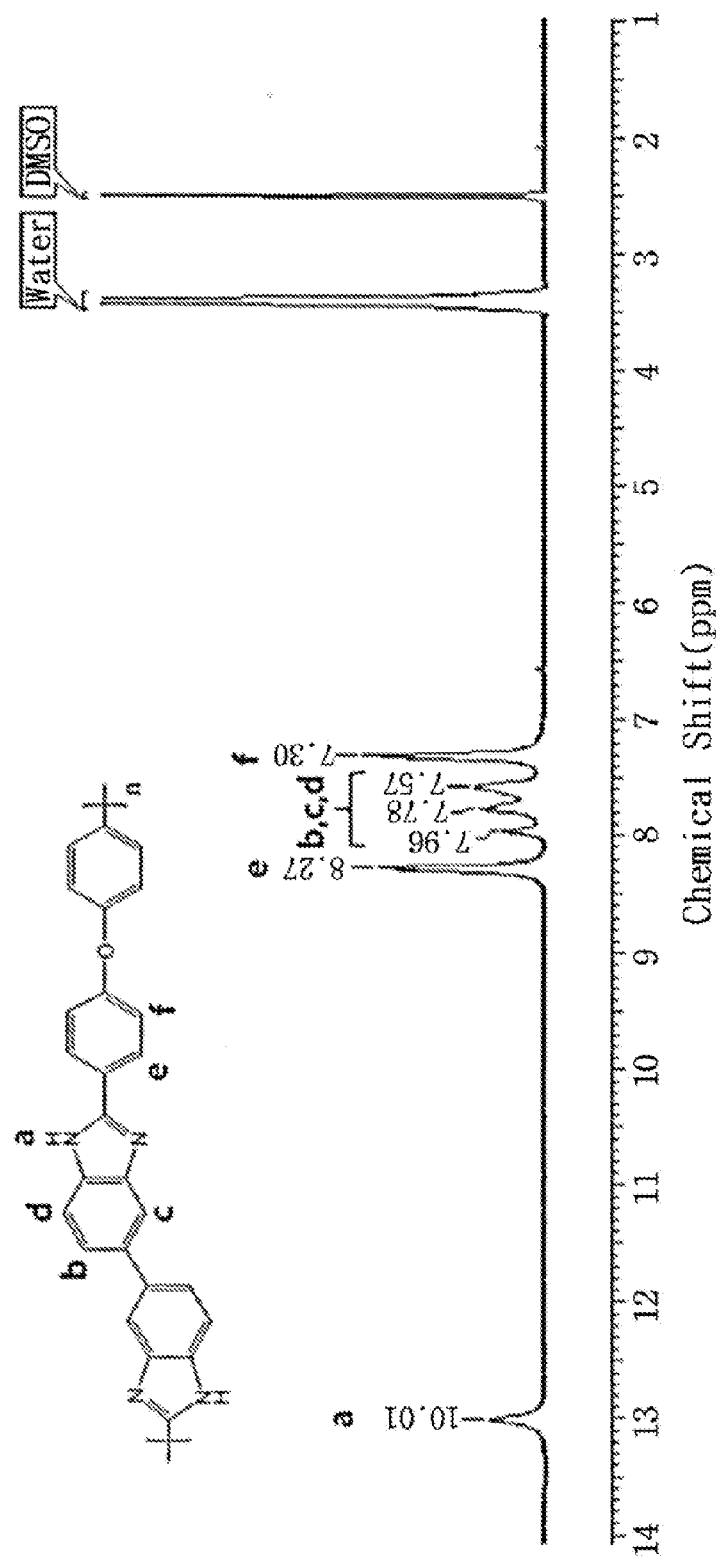

FIGS. 1A and 1B illustrate the results of $^1$H-NMR of the polymer structures of PBI-IPA and PBI-OBBA polymerized from Test Examples. FIG. 1A illustrates the analysis results of PBI-IPA, and FIG. 1B illustrates the analysis results of PBI-OBBA.

As shown in FIGS. 1A and 1B, the protons of N—H in a FBI benzimidazole ring and the aromatic protons in a benzene ring show expected integration ratios at about 13 ppm and 7-9 ppm, respectively. This demonstrates that PBI-IPA and PBI-OBBA are prepared successfully.

Methyl groups are introduced to the nitrogen atoms in the benzimidazole ring of the prepared polybenzimidazole derivatives to provide Comparative Examples and benzyl groups are introduced similarly to provide Examples.

Figure 2:
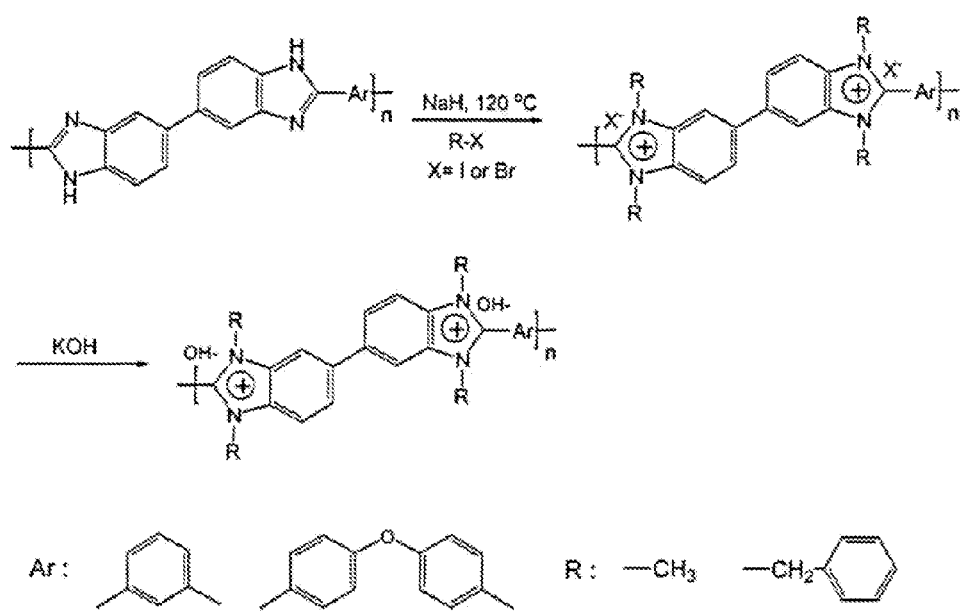
FIG. 2 is a reaction scheme illustrating substitution of the two nitrogen atoms of PBI benzimidazole ring with methyl groups or benzyl groups, followed by bonding with hydroxide ions according to Test Examples.

FIG. 2 is a reaction scheme illustrating substitution of the two nitrogen atoms of a FBI benzimidazole ring with methyl groups or benzyl groups, followed by bonding with hydroxide ions according to Test Examples. For reference, when the reaction is carried out at room temperature, one hydrogen atom is substituted in the benzimidazole ring. However, since the reaction is further carried out at 120° C. for 48 hours, methyl groups or benzyl groups can be substituted at the positions of nitrogen atoms. This will be explained in detail hereinafter.

Comparative Examples

Preparation of Poly(Dimethylated Benzimidazolium)Iodide

In a round-bottom flask, 1 g of PBI-IPA is dissolved in 40 mL of anhydrous NMP. After adding NaH (0.23 g, 0.029 mol) thereto, the resultant solution is allowed to react at 60° C. for 5 hours. After adding iodomethane (4.6 g, 0.032 mol) thereto, the resultant solution is allowed to react at 12° C. for 48 hours. After the completion of the reaction, the solution is precipitated in acetone and washed with acetone and water several times. Then, the resultant product is dried at 60° C. in a vacuum oven to produce the compound represented by the following Chemical Formula 10 (also expressed as Me-PBI-IPA-I hereinafter). Then, PBI-OBBA polymer is used instead of PBI-IPA to produce the compound represented by the following Chemical Formula 11 (also expressed as Me-PBI-OBBA-I hereinafter).

[Chemical Formula 10]

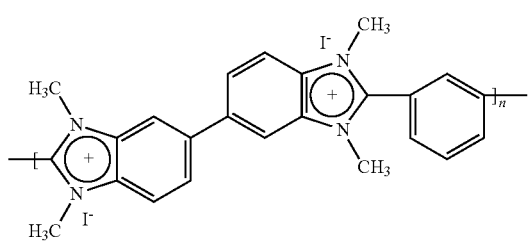

[Chemical Formula 11]

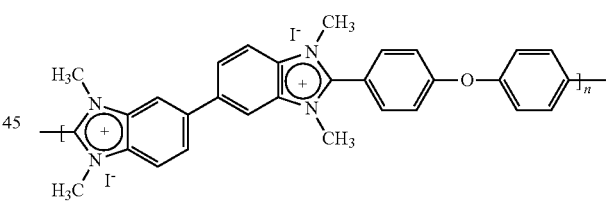

Figure 3A:
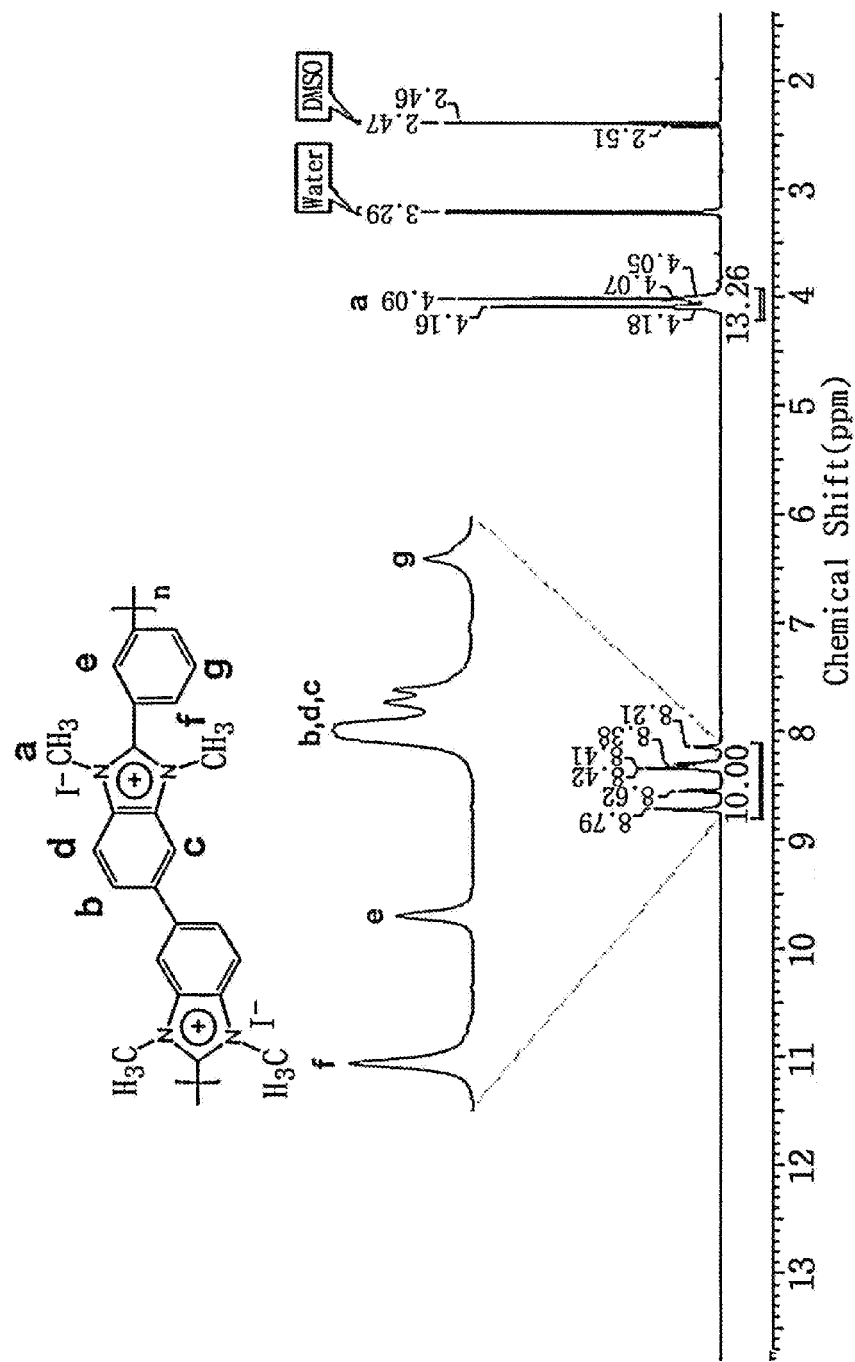
FIGS. 3A and 3B show $^1$H-NMR spectra of dimethylated Me-PBI-IPA-I and Me-PBI-OBBA-I according to Test Examples.
Figure 3B:
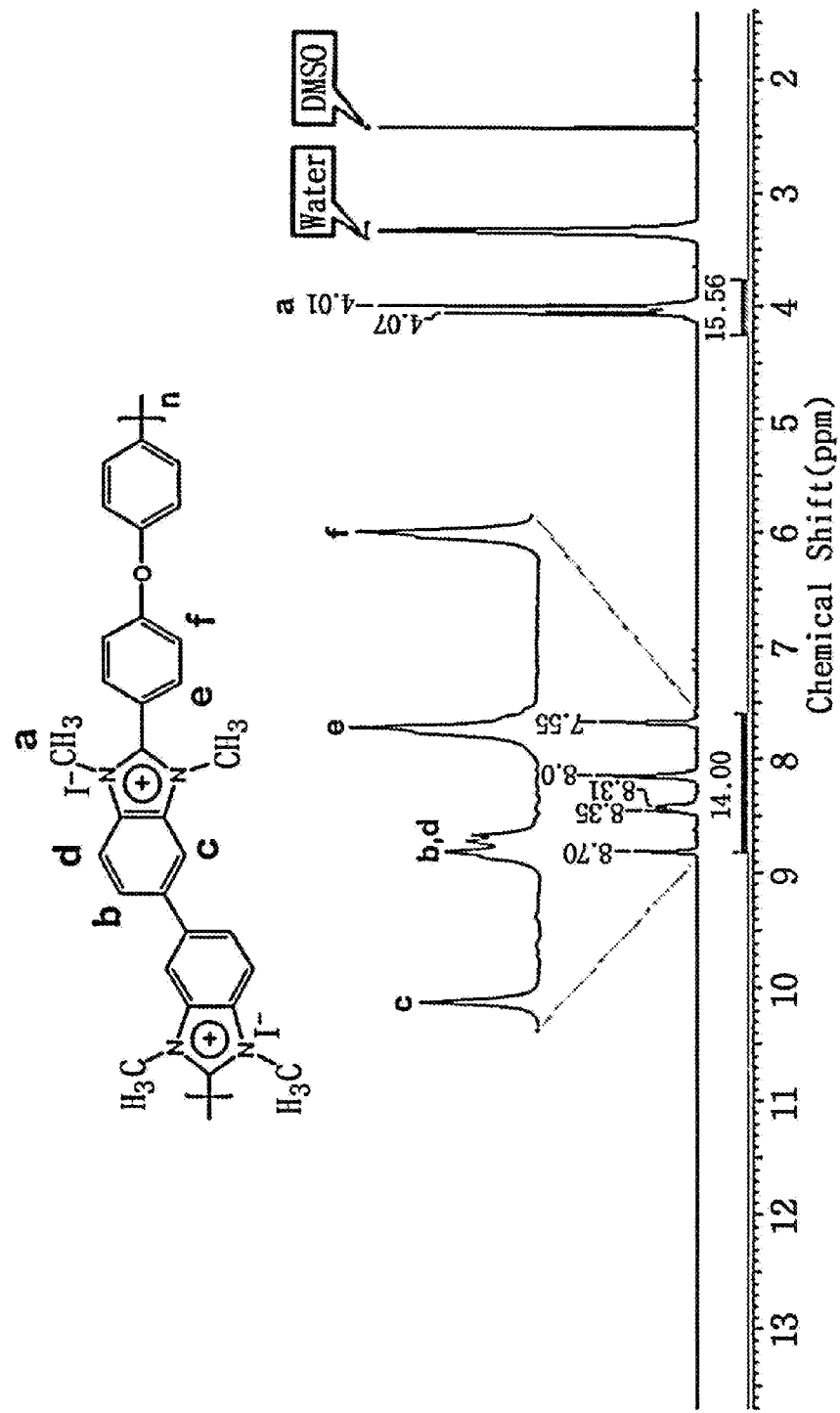

FIGS. 3A and 3B show $^1$H-NMR spectra of dimethylated Me-PBI-IPA-I and Me-PBI-OBBA-I according to Test Examples.

The protons of methyl groups in poly(dimethyl benzimidazolium) iodide show the peaks at about 4 ppm. As estimated from the comparison between the integration of aromatic proton peak and the integration of methyl group proton peak, it can be seen that at least 95% of PBI-IPA and PBI-OBBA are converted into poly(dimethylbenzimidazolium)iodide.

EXAMPLES

Preparation of Poly(Dibenzylated Benzimidazolium)Bromide

In a round-bottom flask, 1 g of PBI-IPA is dissolved in 40 mL of anhydrous NMP. After adding NaH (0.23 g, 0.029 mol) thereto, the resultant solution is allowed to react at 60° C. for 5 hours. After adding benzyl bromide (5.5 g, 0.032 mol) thereto, the resultant solution is allowed to react at 120° C. for 48 hours.

After the completion of the reaction, the solution is precipitated in acetone and washed with acetone and water several times. Then, the resultant product is dried at 60° C. in a vacuum oven to produce the compound represented by the following Chemical Formula 12 (also expressed as Bz-PBI-IPA-I hereinafter).

Meanwhile, PBI-OBBA polymer is used instead of PBI-IPA to produce the compound represented by the following Chemical Formula 13 (also expressed as Bz-PBI-OBBA-I hereinafter).

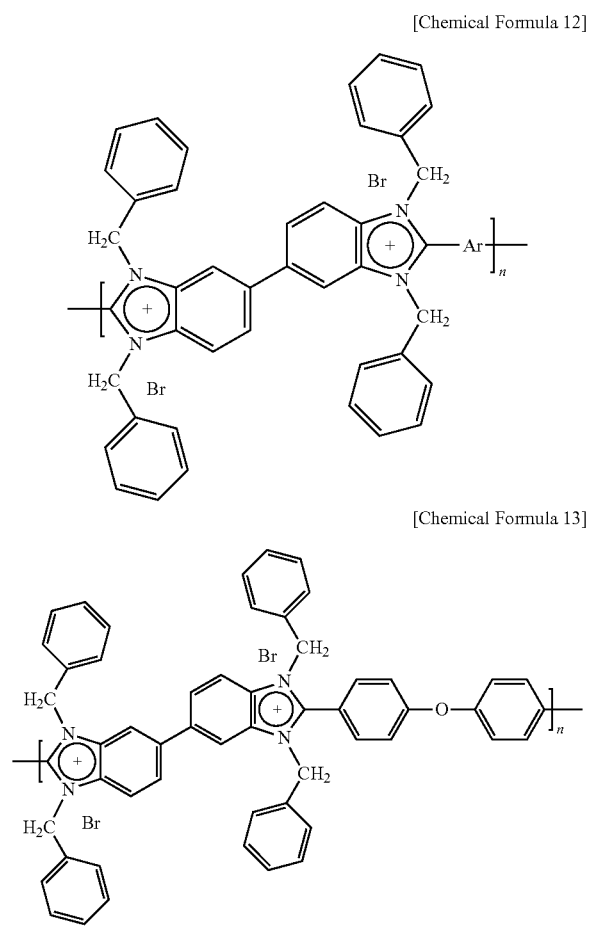

[Chemical Formula 12]

[Chemical Formula 13]

Figure 4A:
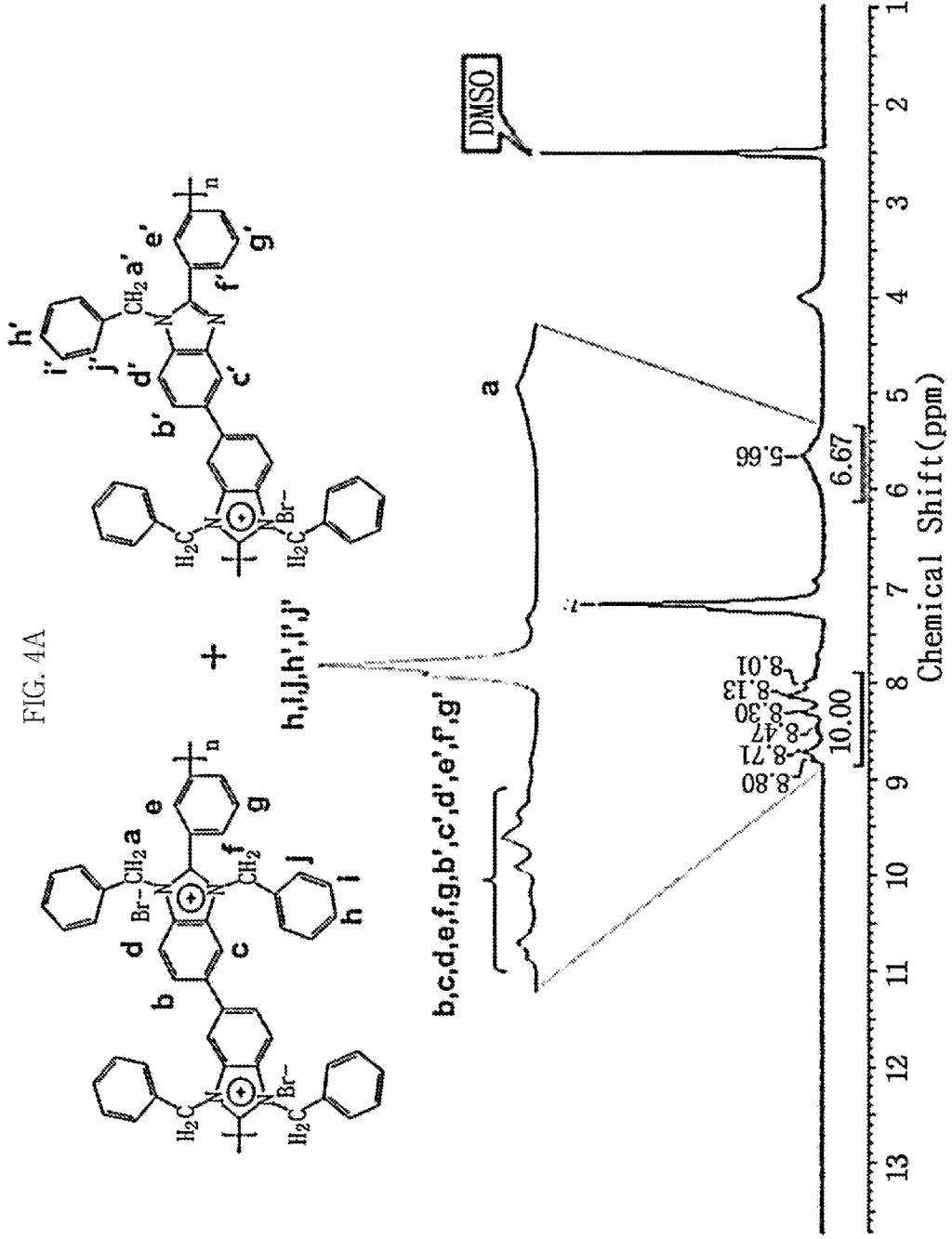
FIGS. 4A and 4B show $^1$H-NMR spectra of Bz-PBI-IPA-Br and Bz-PBI-OBBA-Br according to Test Examples.
Figure 4B:
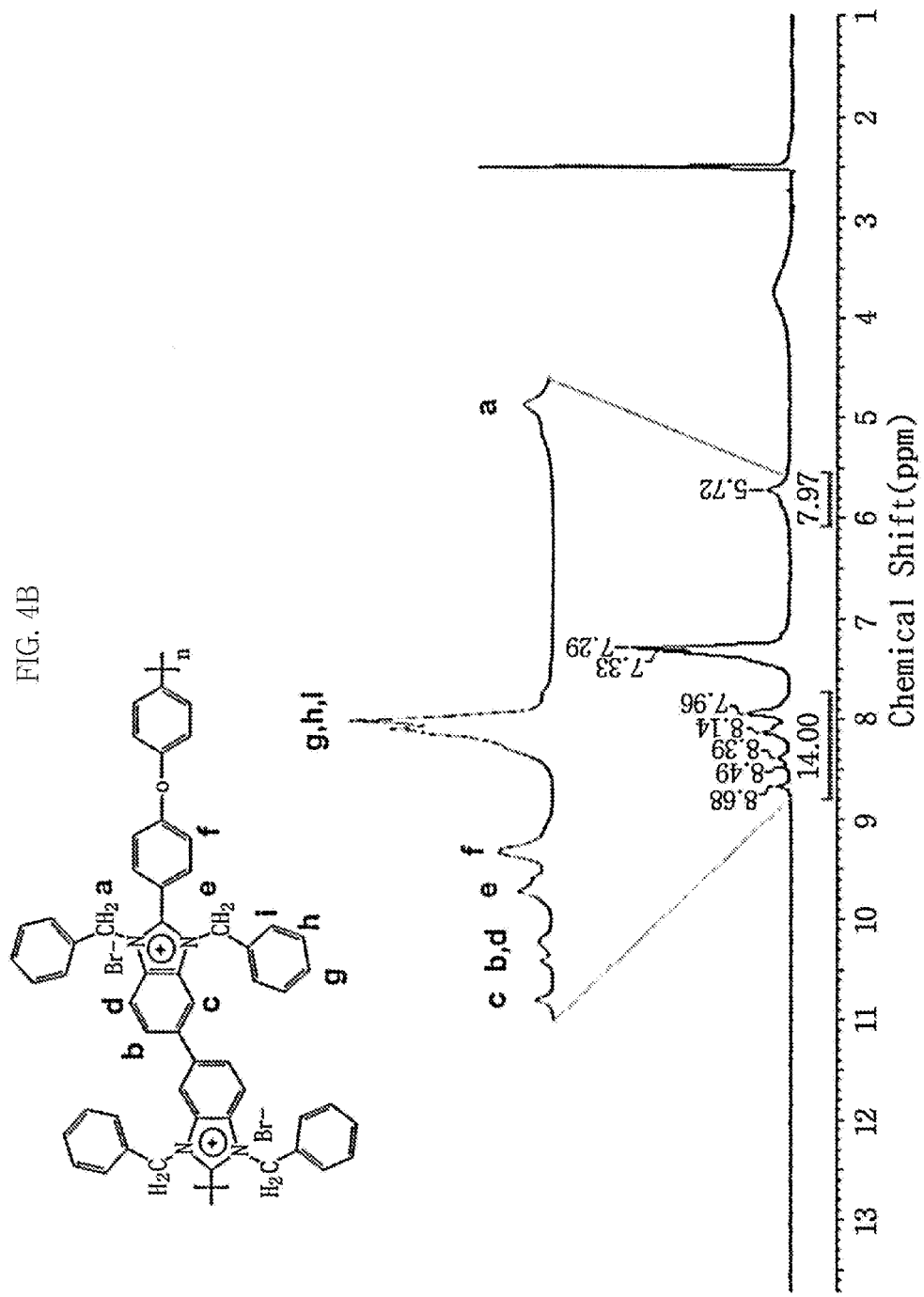

FIGS. 4A and 4B show $^1$H-NMR spectra of the dibenzylated Bz-PBI-IPA-Br and Bz-PBI-OBBA-Br according to Test Examples.

For the benzyl groups of poly(dibenzyl benzimidazolium) bromide, the integration of aromatic protons and methylene protons shows that 80% of PBI-IPA is benzylated. In the case of PBI-OBBA, dibenzylation is carried out to 95%.

Production of Membrane and Ion Exchange Reaction

A polymer membrane is produced by a solution casting process. The poly(dialkylated benzimidazolium) halides according to Comparative Examples and Examples are dissolved into N-methyl-2-pyrrolidone (NMP) as a solvent at 50° C. Then the solution is adjusted to a concentration of 4 wt %. The resultant solution is filtered through a syringe having pores of 0.45 μm and poured onto a flat glass petri dish. Then, the resultant product is dried in a vacuum oven to obtain a film with a thickness of 35 μm. The resultant poly(dialkylated benzimidazolium) halide polymer membrane is dipped into 1M potassium hydroxide (KOH) solution at room temperature for 24 hours so that the halide ions are exchanged with OH$^-$ ions (see FIG. 2). To remove the potassium hydroxide solution remaining on the membrane, the membrane is washed with deionized water several times and stored in purified water.

$^1$H-NMR Analysis

To determine polymer structures, $^1$H NMR spectrometry is carried out and the spectra are analyzed.

After the polymerization, 0.01 g of FBI is dissolved in 0.9 mL of DMSO-d$_6$ and the solution is transferred to an NBR tube so that the structure of the polymer is analyzed at 300 MHz (300 MHz Bruker AV 300 Spectrometer).

Figure 5A:
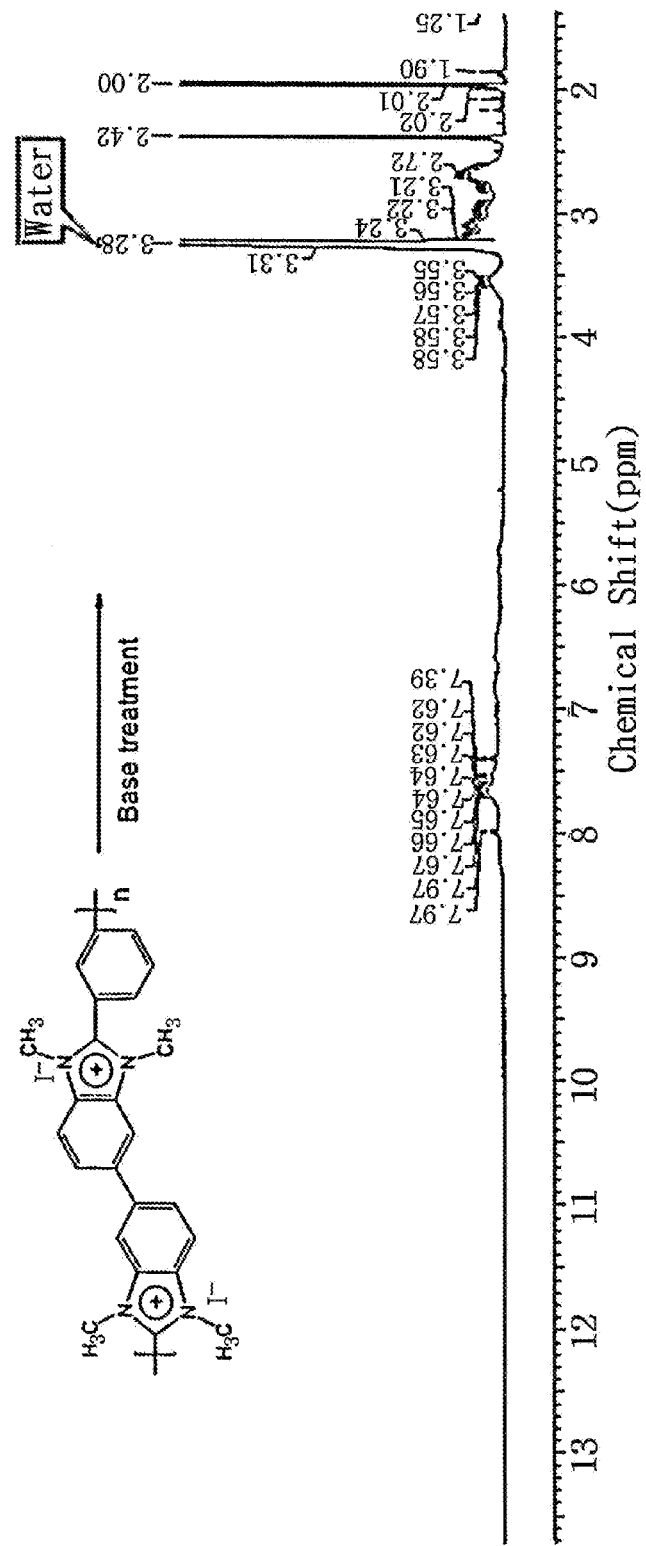

FIGS. 5A and 5B show the results of $^1$H-NMR after subjecting the membranes (Me-PBI-IPA-I and Me-PBI-OBBA-I) of Comparative Examples to ion exchange in a potassium hydroxide solution.

As shown in FIGS. 5A and 5B, after the treatment with strong alkali, the peak strength at 4 ppm for methyl protons in Comparative Examples (Me-PBI-IPA-I and Me-PBI-OBBA-I) decreases and a new peak appears at about 2 ppm. In addition, it is shown that the peak of aromatic protons undergoes a strong change. This suggests that even though the membrane maintains its shape, the benzimidazole ring cannot resist against the strong alkalinity of hydroxide ions and is broken.

Figure 6A:
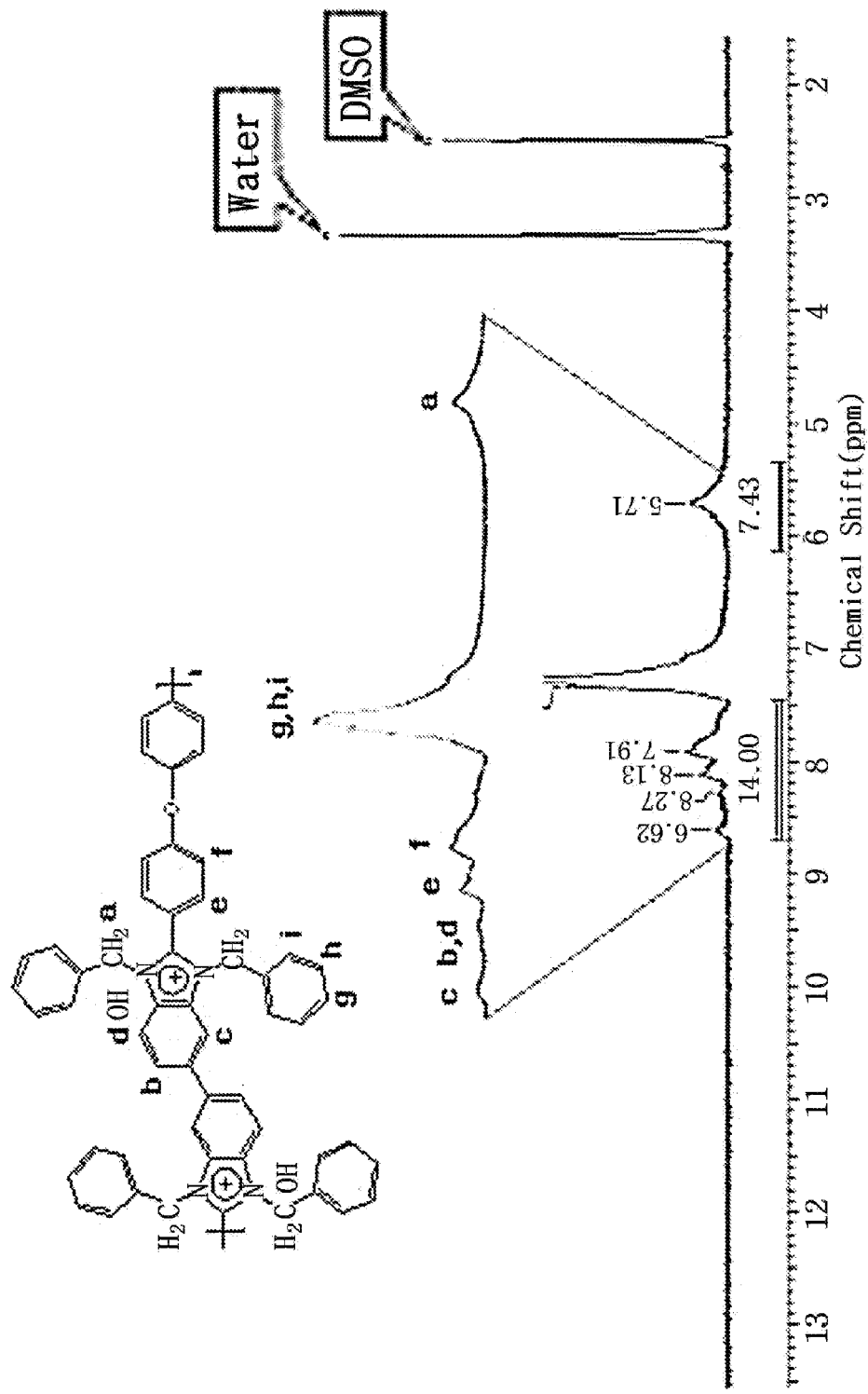
FIGS. 6A and 6B show the results of $^1$H-NMR after subjecting the membranes (Bz-PBI-IPA-Br and Bz-PBI-OBBA-Br) of Examples to ion exchange in a potassium hydroxide solution.
Figure 6B:
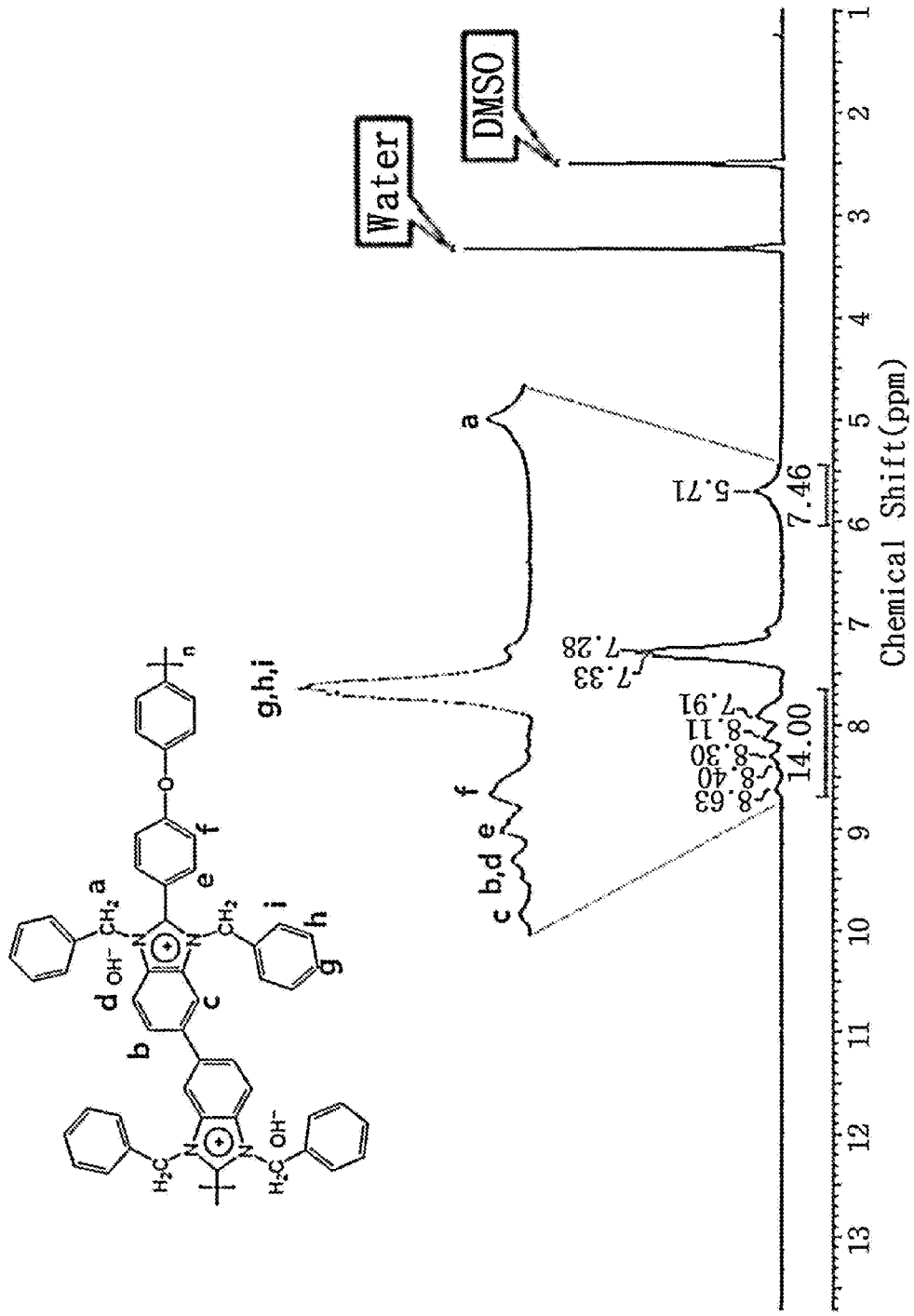

FIGS. 6A and 6B show the results of $^1$H-NMR after subjecting the membranes (Bz-PBI-IPA-Br and Bz-PBI-OBBA-Br) of Examples to ion exchange in a potassium hydroxide solution. In other words, even after poly(dibenzyl benzimidazolium)bromide is treated with strong alkali, the positions and peaks of aromatic protons of benzyl group and methylene protons show little change as compared to poly (dibenzylbenzimidazolium)bromide before the treatment with strong alkali (see FIGS. 4A and 4B). Meanwhile, the membranes are treated in 3M KOH solution at 60° C. for 48 hours.

Figure 7A:
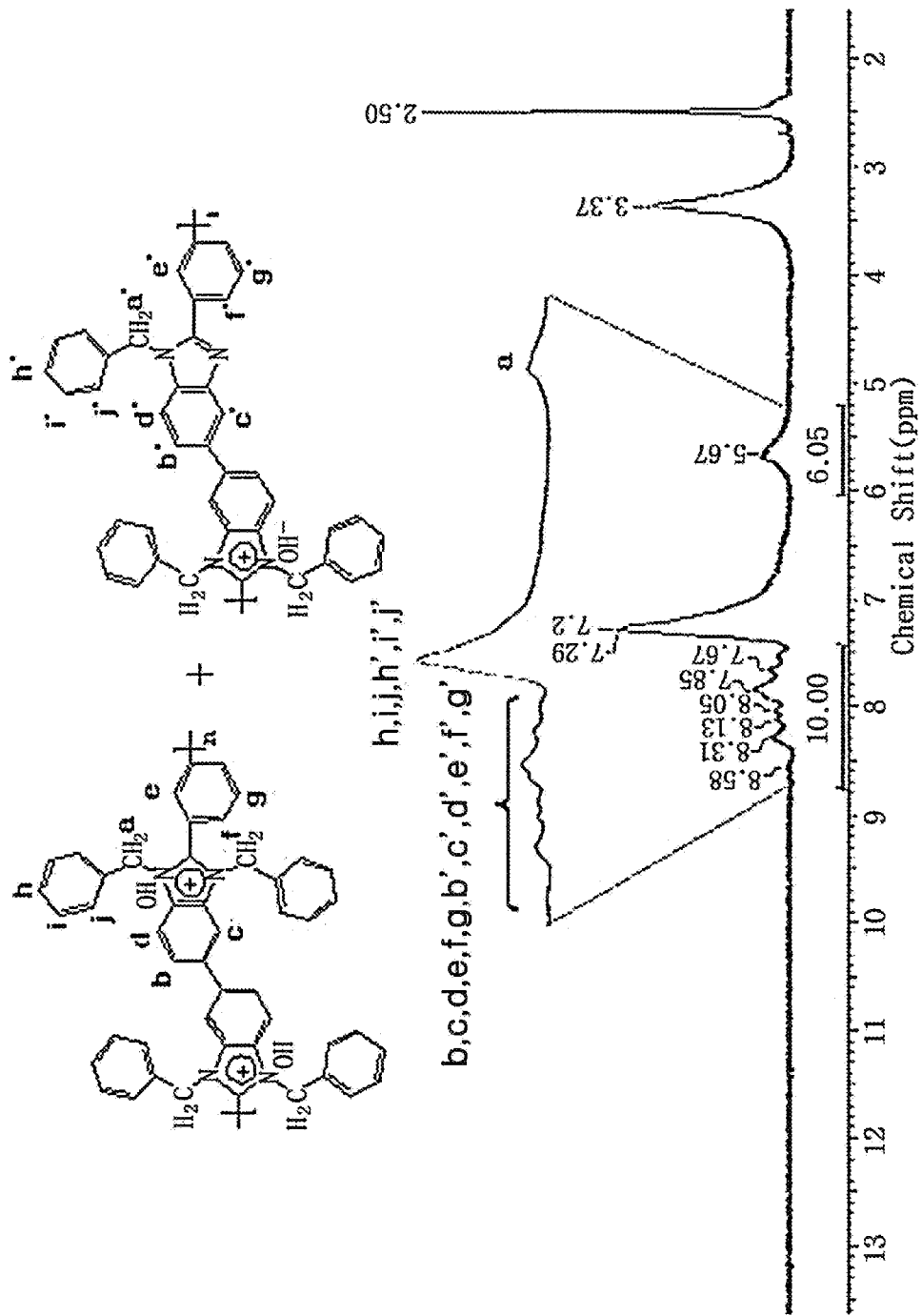
FIGS. 7A and 7B show the results of $^1$H-NMR after treating the membranes (Bz-PBI-IPA-Br and Bz-PBI-OBBA-Br) of Examples at 60° C. for 48 hours in a potassium hydroxide solution.
Figure 7B:
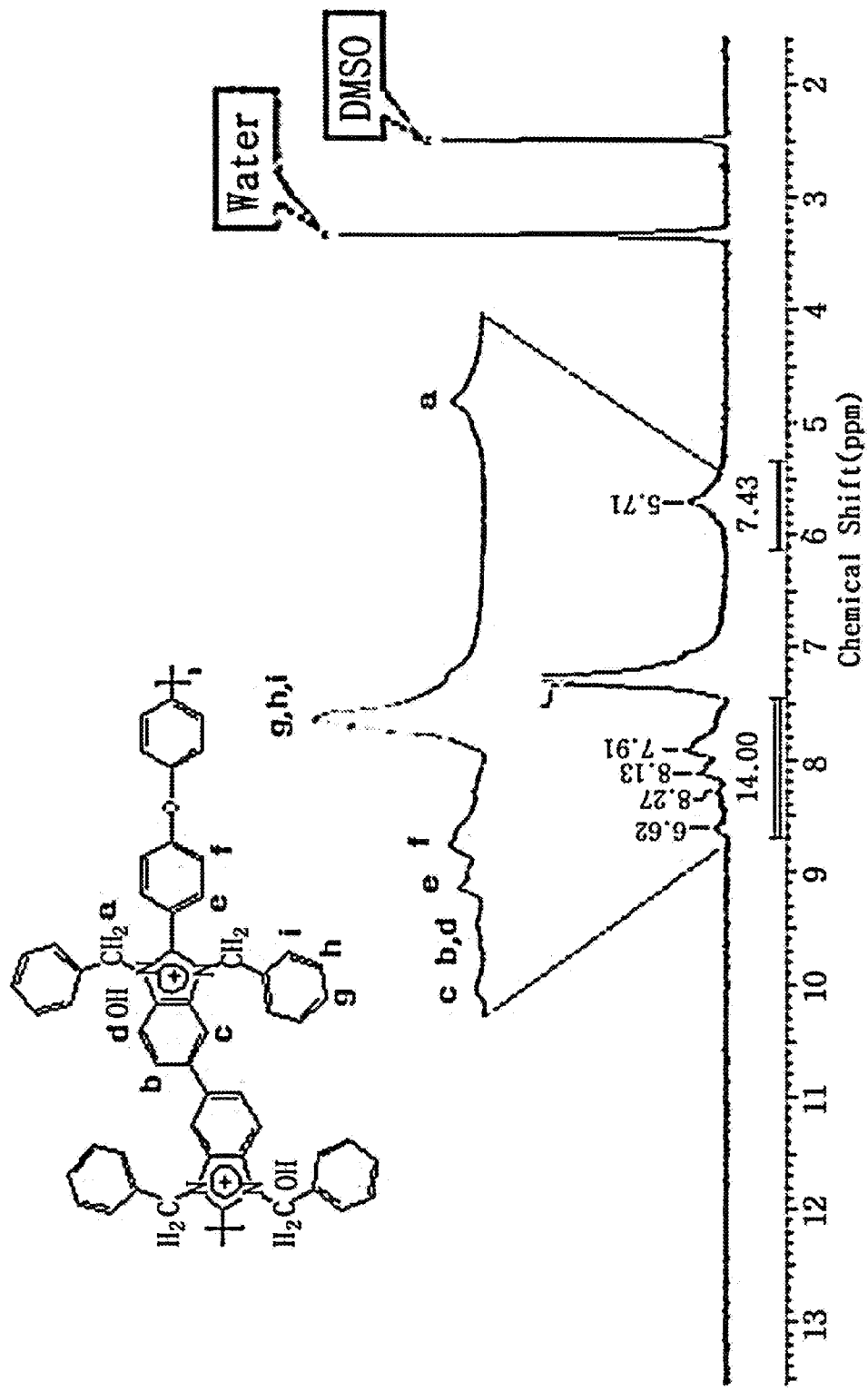

FIGS. 7A and 7B show the results of $^1$H-NMR after treating the membranes (Bz-PBI-IPA-Br and Bz-PBI-OBBA-Br) of Examples at 60° C. for 48 hours in a potassium hydroxide solution. In addition, as compared to FIGS. 6A and 6B, $^1$H-NMR spectra (FIGS. 7A and 7B) of Bz-PBI-OBBA-hydroxide and Bz-PBI-IPA-hydroxide show little change, demonstrating that the benzimidazole ring structure is very stable.

As can be seen from the foregoing, benzyl group substitution in a polybenzimidazole based polymer provides higher stability in strong alkali as compared with methyl group substitution in a polybenzimidazole based polymer. This can be also seen from the fact that specific peaks still appear in $^1$H-NMR spectra even after alkali ion exchange and the other peaks are not found.

Properties of Poly(Dibenzylated Benzimidazolium)Hydroxide

Hydroxide ion conductivity is determined for Bz-PBI-IPA-hydroxide and Bz-PBI-OBBA-hydroxide.

In-plane conductivity measurement is carried out by using 4-probe technique. Impedance measurement is carried out in a galvanostatic mode with a perturbation amplitude of 5 mA with a frequency range of 1 Hz-1 MHz. The impedance of membrane is determined with Nyquist plot in a chamber controlled to a temperature from 30° C. to 90° C. under a relative humidity of 90% or higher. The conductivity (σ) is calculated by the following Mathematical Formula 1:

$$\sigma = \frac{L}{RA}$$ [Mathematical Formula 1]

wherein L is a distance between the reference electrode and the sensing electrode, A is the sectional area of a membrane (thickness×width), and R is the ion conduction resistance of a membrane derived from Nyquist plot.

Figure 8:
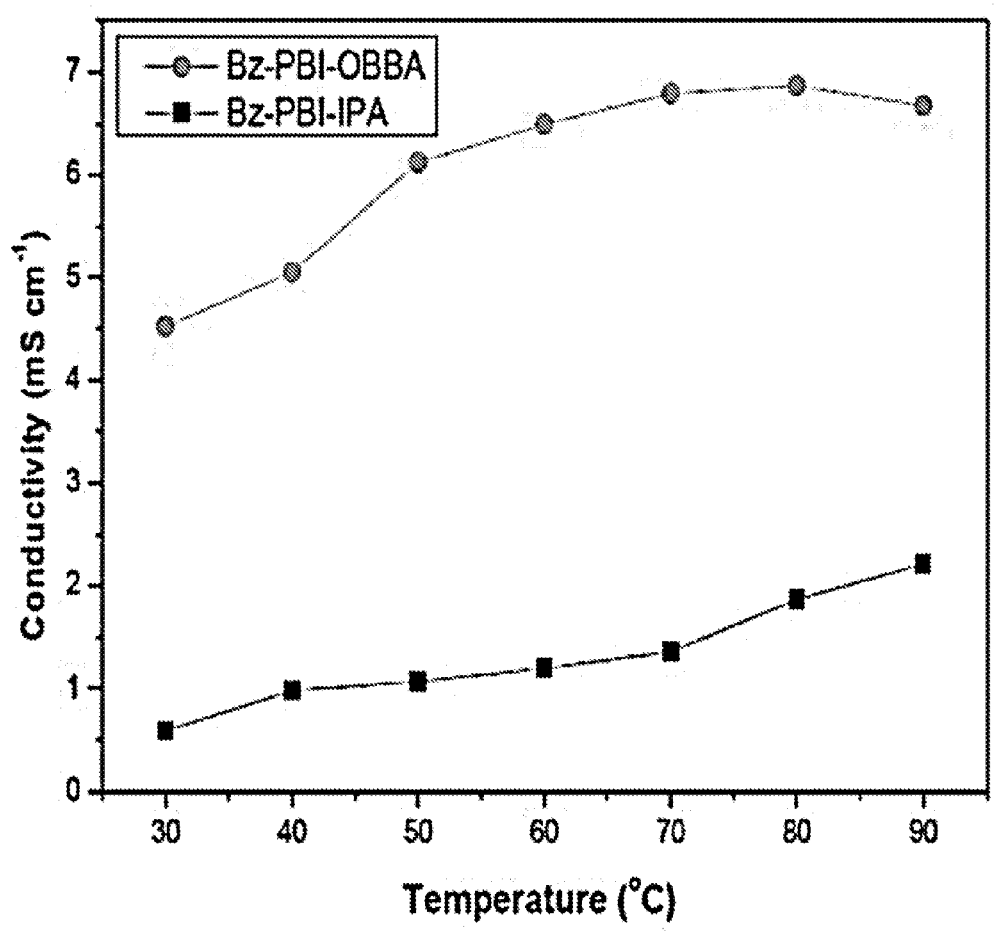
FIG. 8 illustrates the ion conductivity of the membranes according to Examples, wherein X axis represents temperature (unit: ° C.) and Y axis represents ion conductivity (unit: mS/cm).

FIG. 8 illustrates the ion conductivity of the membranes according to Examples, wherein X axis represents temperature (unit: ° C.) and Y axis represents ion conductivity (unit: mS/cm).

For each membrane, higher ion conductivity is obtained as the temperature of a membrane increases. In the case of Bz-PBI-IPA-hydroxide, the highest ion conductivity is 1.13 mS/cm at 80° C. For reference, the benzylation degree of PBI-IPA is 80%, resulting in a decrease in introduction of hydroxide groups in a polymer backbone after alkali treatment. For this reason, water absorption is relatively low and alkalization is not performed completely.

Figure 9:
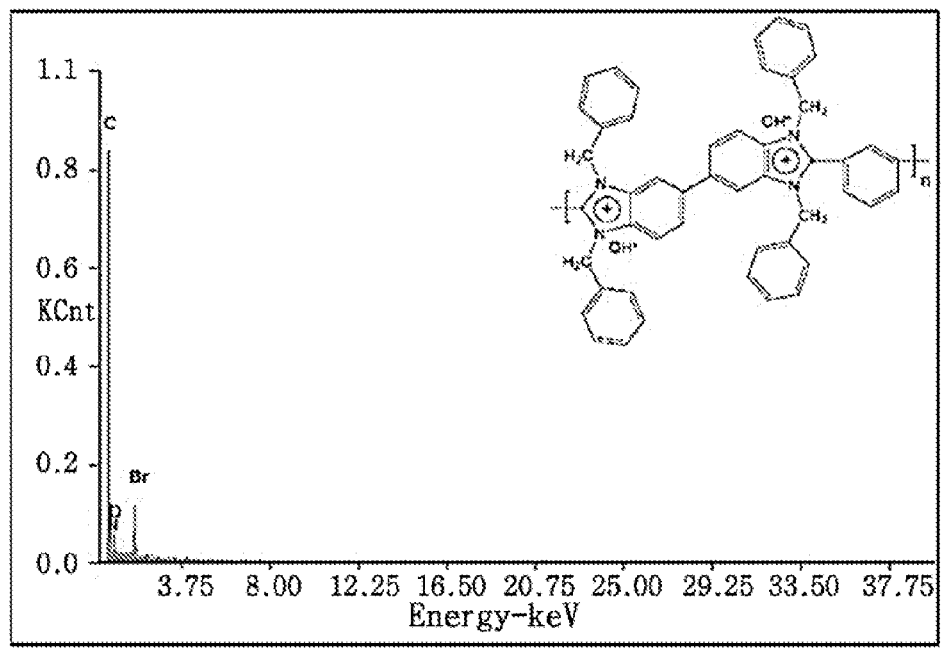
FIG. 9 is an Energy-dispersive X-ray spectroscopy (EDX) graph of Bz-PBI-IPZ-hydroxide and Bz-PBI-OBBA-hydroxide according to Examples.
Figure 9:
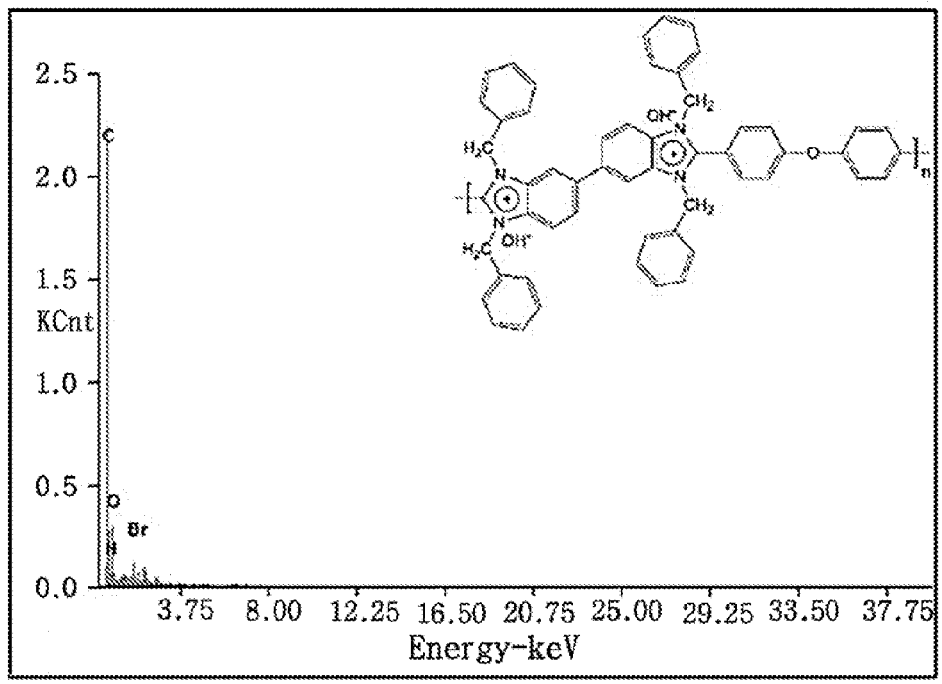

Meanwhile, FIG. 9 is an Energy-dispersive X-ray spectroscopy (EDX) graph of Bz-PBI-IPZ-hydroxide and Bz-PBI-OBBA-hydroxide according to Examples.

It can be seen from FIG. 9 that a larger amount of bromide remains in the Bz-PBI-IPA-hydroxide membrane. It is thought that this is the main cause of the ion conductivity of Bz-PBI-IPA-hydroxide lower than the ion conductivity of Bz-PBI-OBBA-hydroxide.

As can be seen from the foregoing, poly(dibenzylated benzimidazolium) halide having stronger alkali resistance is obtained according to some embodiments, and poly(dibenzylated benzimidazolium) hydroxide is prepared by using the polymer. In this manner, it is possible to prevent decomposition of a benzimidazole ring occurring when treating poly(dimethylated benzimidazolium) halide with alkali, and thus to improve the stability of a polybenzimidazole based polymer significantly. In addition, the electrolyte membrane including the poly(dibenzylated benzimidazolium) hydroxide maintains high ion conductivity and excellent alkali resistance, and thus can be used advantageously as an electrolyte membrane for solid alkali exchange membrane fuel cells (SAEMFC).

While the exemplary embodiments have been shown and described, it will be understood by those skilled in the art that various changes in form and details may be made thereto without departing from the spirit and scope of the present disclosure as defined by the appended claims. In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A dibenzylated polybenzimidazole based polymer comprising dibenzylated benzimidazolium in which substituted or non-substituted benzyl groups are bound to each of the two nitrogen atoms of benzimidazole ring of a polybenzimidazole based polymer,
wherein the dibenzylated polybenzimidazole based polymer is poly(dibenzylated benzimidazolium) hydroxide in which hydroxide is bound to dibenzylated benzimidazolium; and
wherein the poly(dibenzylated benzimidazolium) hydroxide is a compound represented by the following Chemical Formula 7:

[Chemical Formula 7]

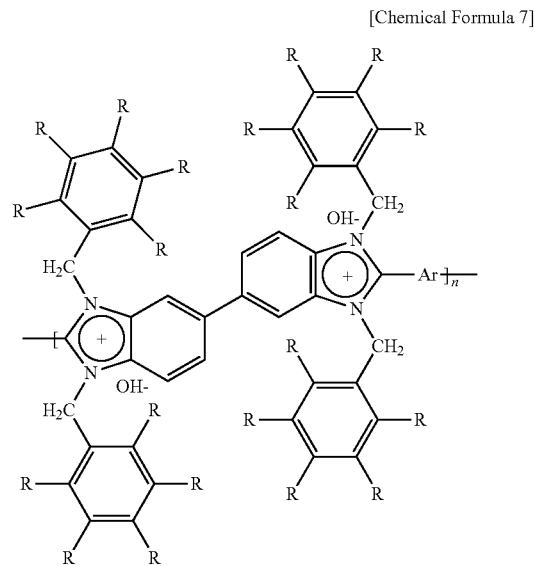

wherein Ar is

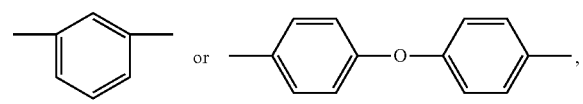

R independently represents H, alkyl group, $NO_2$, $NH_3$, OH or $SO_3H$, the alkyl group is methyl, ethyl, propyl, butyl or tert-butyl group, and n is the number of repeating units.

2. The dibenzylated polybenzimidazole based polymer according to claim 1, wherein the benzyl group is substituted with an alkyl group, $NO_2$, $NH_3$, OH or $SO_3H$, and the alkyl group is methyl, ethyl, propyl, butyl or tert-butyl group.

3. An electrolyte membrane comprising the poly(dibenzylated benzimidazolium) hydroxide as defined in claim 1.

4. A solid alkali exchange membrane fuel cell comprising the electrolyte membrane as defined in claim 3.

* * * * *